Dec. 30, 1969    D. G. WATERMAN    3,486,234
SOLAR CLOCK
Filed Feb. 20, 1967    2 Sheets-Sheet 1
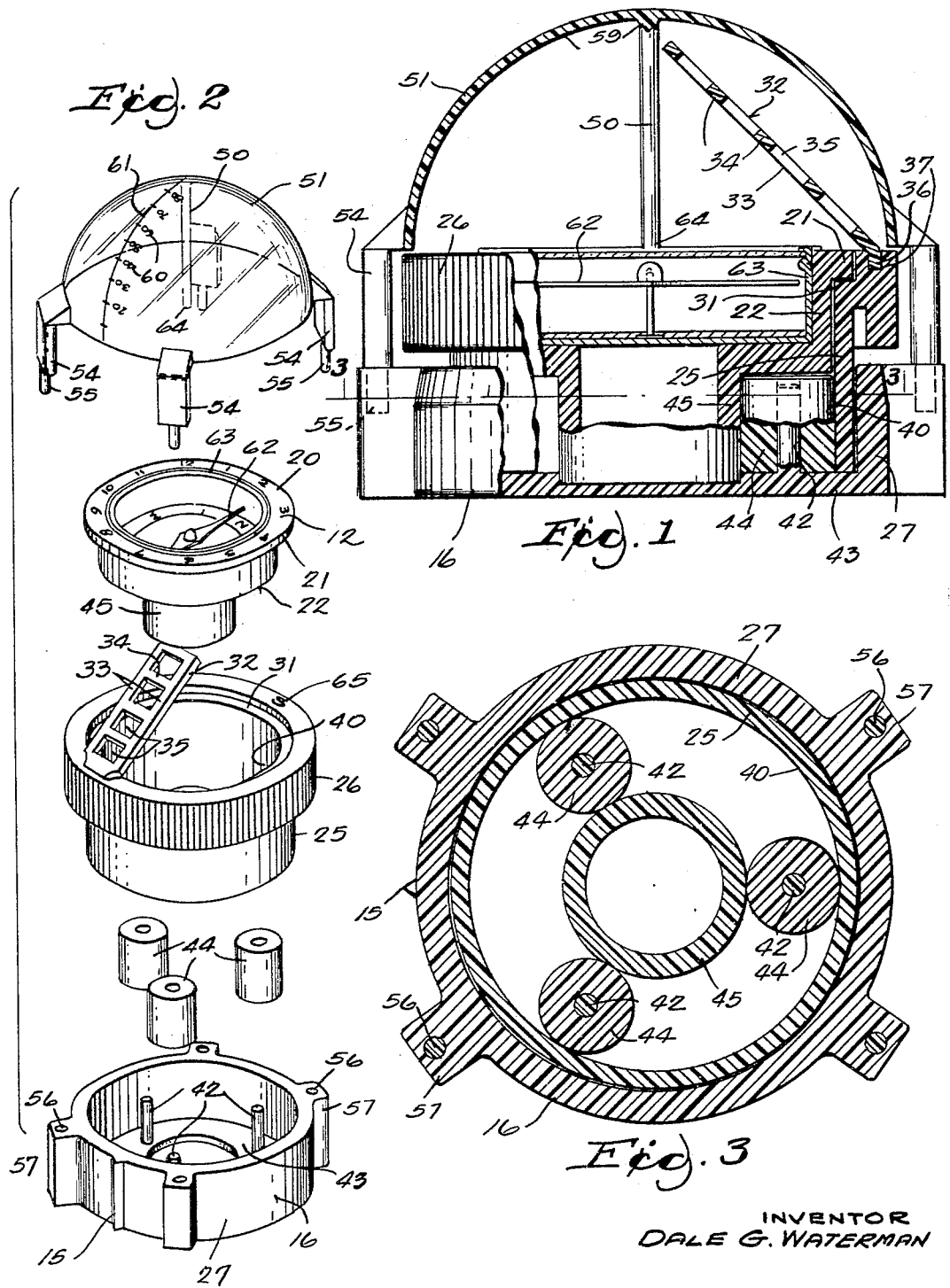
INVENTOR
DALE G. WATERMAN
BY Wheeler, Wheeler, House & Clemency
ATTORNEYS Dec. 30, 1969   D. G. WATERMAN   3,486,234
SOLAR CLOCK Filed Feb. 20, 1967   2 Sheets-Sheet 2

INVENTOR
DALE G. WATERMAN
BY Wheeler, Wheeler, House & Clemency
ATTORNEYS

United States Patent Office 3,486,234
Patented Dec. 30, 1969

3,486,234
SOLAR CLOCK
Dale G. Waterman, La Crosse, Wis., assignor to Watfo Corporation, La Crosse, Wis., a corporation of Wisconsin
Filed Feb. 20, 1967, Ser. No. 617,381
Int. Cl. G04b 49/02
U.S. Cl. 33—62                                                    19 Claims

ABSTRACT OF THE DISCLOSURE

Disclosed herein is a portable solar clock or sun dial which will record or indicate standard time, and which is adjustable to correct for changes in latitude, longitude, the equation of time and magnetic declination. The solar clock includes a clock dial on a rotatable inner unit, a shadow screen supported on a concentric, rotatable outer sleeve, and a shadow bar supported above the clock dial by a transparent, hemispherical dome which contains an arc-line having latitude graduations. When the solar clock is calibrated and properly oriented, the correct time is obtained by rotating the sleeve carrying the shadow screen, to intercept the shadow cast by the shadow bar. A planetary roller drive coupling the sleeve to the rotatable inner unit thus rotates the clock dial, registering the correct time at an index and beneath the latitude line. Slippage in the planetary drive affords adjustment to take into account the variables of latitude, longitude, equation of time and magnetic declination.

Background of invention

Attempts to provide a portable solar clock or sun dial which will accurately record or indicate standard time at any location, have been largely unsuccessful because of the difficulties encountered in applying corrections for several variables which must be considered to obtain correct time. When a sun dial is constructed for use at a permanent location, the dial is calibrated taking the latitude and longitude variables into consideration. With a portable dial, it is necessary to change the calibration or apply appropriate corrections as the location is changed. In addition to the latitude and longitude variables, a correction must be applied for the equation of time to translate the apparent solar time into standard time. In the construction of sun dials, it is assumed that the path of the sun relative to the earth is the celestial equator which is a projection of the earth's equator upon the celestial sphere. However, this assumption is not correct and the sun actually follows an elliptical path called the ecliptic, with the sun appearing north of the celestial equator in the summer and south in the winter, in the northern hemisphere. This declination of the sun results in an apparent slowing or increase in the speed of the sun. Thus, a sun dial may record noon when a watch set for standard time indicates 11:55 or 12:05. This is commonly called sun fast or sun slow. Tables are available in almanacs to determine the correction for equation of time that must be applied each day of the year to equate apparent solar time to standard time.

A correction must be applied for the difference in longitude from the standard time meridian in the particular standard zone. A standard time zone spans 15° of longitude and although a conventional clock or watch will record the same time within that zone, a sun dial will vary as the longitude varies; with each degree of longitude being equal to four minutes of time.

In construction of a portable sun dial it is also necessary to make adjustment or recalibration for change in latitude with change in location. Since the shadow bar of any sun dial must point to the celestial pole, be parallel to the orbital axis of the earth and make an angle with the horizon equal to the latitude at the location of use, either the shadow bar must be adjustable or a correction must be applied.

If a magnetic compass is used to assist in aligning the shadow bar parallel with the celestial pole, the magnetic declination of the location of use must be considered. It is also desirable to have a sun dial or solar clock which can read daylight savings time.

Although various portable sun dials and solar clocks have been developed to take some or all of the above factors into consideration, to obtain standard time, the sun dials have been rather complex, difficult to calibrate and read.

Summary of invention

The present invention provides a small portable solar clock that can also be utilized as a sun compass, which has a dial similar to a watch, and which directly indicates or records standard time, and is easily calibrated in the location of use to take into consideration variables such as latitude, longitude, the equation of time and magnetic declination.

Difficulty in locating and reading the shadow on a clock face is eliminated by the use of an upstanding shadow screen. The shadow screen is generally in the form of a ladder with rungs, forming windows, the shadow cast by the shadow bar being easily observed on the top of the ladder rungs. The screen is supported on a sleeve which is manually rotatable to position the screen to intercept the shadow cast by a shadow bar. The shadow bar depends downwardly from the underside of a transparent hemispherical dome which encloses the top of the solar clock.

The clock dial has twelve hour marks equally spaced in a circle as a conventional clock and is located on an inner unit concentric and co-axial with the sleeve carrying the shadow screen. Manual rotation of the sleeve supporting the shadow screen to intercept the shadow cast by the shadow bar rotates the clock dial by means of a planetary roller drive rotating the clock dial for registration of the correct time at an index mark. Thus, the time is always observed at the same index mark and can be easily read by the observer when the shadow screen is positioned to intercept the shadow at the midpoint of the rungs.

Adjustment and calibration of the solar clock, to take into account the equation of time, magnetic declination, and longitude within a time zone, is accomplished by manual rotation of the clock dial to set the dial at the correct time by the use of known time, at the location of the observer. Change in the relative position of the clock dial to the shadow screen is afforded by impositive engagement which provides slippage of the planetary rollers when the sleeve and base are held stationary and torque is applied to the inner rotor unit containing the clock dial.

Orientation of the shadow bar at the angle of latitude of the observer is accomplished by the use of an arc line containing latitude graduations on the hemispherical dome which facilitates positioning the shadow bar parallel to the orbital axis of the earth. A magnetic compass is carried in a receptacle in the inner rotor unit to assist in orienting the latitude line in a north, south direction.

When the solar clock is calibrated with known time by changing the relative positions of the shadow screen and clock dial by slippage of the planetary drive any magnetic declination from true north, and any error thus in orientation of the shadow bar is corrected.

The solar clock can also be used as a sun compass to determine north when the magnetic declination or magnetic anomalies of a particular area render magnetic compass readings unreliable.

The solar clock of the invention can be inexpensively constructed entirely of plastic, except for the compass needle and pivot therefor.

Further objects and advantages of the present invention will become apparent from the following disclosure.

Drawings

FIGURE 1 is an elevational view in fragmentary section of a solar clock embodying various of the features of the present invention.

FIGURE 2 is an exploded view of the solar clock shown in FIGURE 1.

FIGURE 3 is a sectional view along line 3—3 of FIGURE 1.

Description of the preferred embodiment

Figure 4:
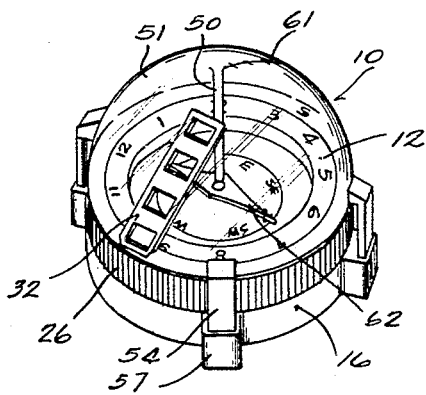
FIGURE 4 is a perspective view of the solar clock shown in FIGURE 1.
Figure 5:
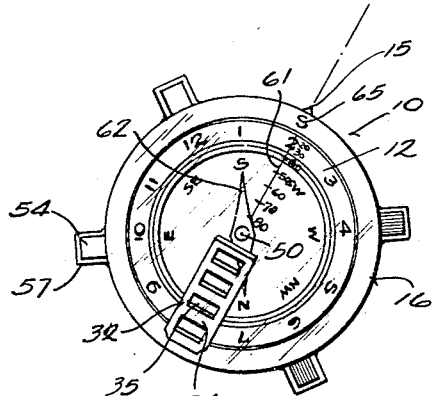
FIGURE 5 is a plan view of the solar clock with the shadow screen positioned to intercept the shadow cast by the shadow bar.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings there is shown a small portable solar clock 10 which can be carried in the pocket of a user and which is easily calibrated at different locations of use to directly indicate standard time.

To eliminate difficulties in locating and reading a shadow, cast on a dial, containing time indicia, the present invention utilizes a clock dial 12, calibrated in the manner of a conventional clock with twelve hour marks, or indicia with each indicium spaced 30° apart. When the solar clock 10 is calibrated and aligned with the orbital axis of the earth as hereinafter described in detail, the correct standard time is read on the clock face or dial 12 at an index mark 15 (FIG. 3) located on the base 16 or outer rotor of the solar clock 10 or at the lower end of latitude line 61. As best shown in FIGURE 2, the clock dial 12 is located on the upper face 20 of an outturned flange 21 of a rotatable inner unit 22.

Clock dial 12 is carried on an inner rotor unit 22 which is turnably supported within a rotor sleeve 25. Sleeve 25 is concentric and co-axial with a cylindrical wall 27 of base 16 and also co-axial and concentric with the inner rotor unit 22. Flange 21 of the inner rotor unit 22 rests on an annular shoulder 31 of rotor sleeve 25. Sleeve 25 carries a ladder-like shadow screen 32 which has spaced side rails 33 joined by rungs 34, thus forming windows 35. A locking tab 36 at the lower end of screen 32 frictionally interfits into a socket 37 in sleeve 25 to secure the shadow screen 32 to the sleeve 25. Socket 37 is desirably vertically aligned. Tab 36 is joined to screen 32 at an angle (typically about 45°) thus to support ladder 32 at an angle to the clock face.

Observable indicia such as a shadow screen 32 is desirably of a sufficient length to intercept a shadow, when the sun is below the celestial equator during winter, and and inclined inwardly at an angle so that it is enclosed by dome 51 hereinafter described. Manual rotation of the rotor sleeve 25 is facilitated by a concentric knurled outer ring 26 of larger diameter than the sleeve 25.

In accordance with the invention motion transmitting means is provided to co-operatively rotate the clock dial 12 for registration of the correct time at the index 15, upon manual rotation of sleeve 25 in the course of positioning the shadow screen for interception of the shadow cast by shadow bar 50.

In the disclosed construction, such motion transmitting means comprise a planetary roller drive. A set of three rollers 44 are turnably mounted on three upstanding posts 42, secured to the inner floor 43 of the base 16. Posts 42 are equally spaced about the axis of sleeve 25, and inner unit 22. The posts 42 provide axes for the three planetary rollers 44. The planetary ring of the planetary drive is the inner wall 40 of rotor sleeve 25. Wall 40 frictionally engages the rollers 44. The sun roller is provided by a hallow axial extension 45 of inner rotor unit 22 and is in frictional engagement with rollers 44. The ratio of the circumference of axial extension 45 to the circumference of inner wall 40 is 2:1. Thus, rotation of sleeve 25 through an arc of 15° will counter-rotate the inner rotor unit 22 and dial face through an arc of 30°. This is the equivalent of one hour of time on the clock face. The 2:1 ratio facilities use of a 360° clock dial to indicate the approximately 180° angular movement of the sun during daylight hours.

The shadow bar 50 is a relatively small diameter plastic rod or stem secured to the apex and underside of a transparent hemispherical dome 51. Shadow bar 50 is co-axial with the inner rotor unit 22 and rotor sleeve 25. The dome 51 is detachably supported above and secured to the base 16 by four spaced depending legs 54 having terminal pegs 55. The pegs 55 frictionally fit in apertures 56 in arcuately spaced radially exetnding mounting ears 57 which are integral with base 16.

Orientation of the shadow bar 50 parallel to the polar axis of the celestial sphere, and parallel to the orbital or polar axis of the earth is facilitated by latitude graduations 60 inscribed on the dome 51 and a latitude arc-line 61 having one end terminating directly above the index 15. The latitude graduations range from 0° to 90°. Orientation of the shadow bar with its upper end 59 inclined in the direction of true north, toward the north celestial pole, is facilitated by a magnetic compass pointer 62 rotatably supported in a receptacle 63 in the center of inner unit 22.

Figure 6:
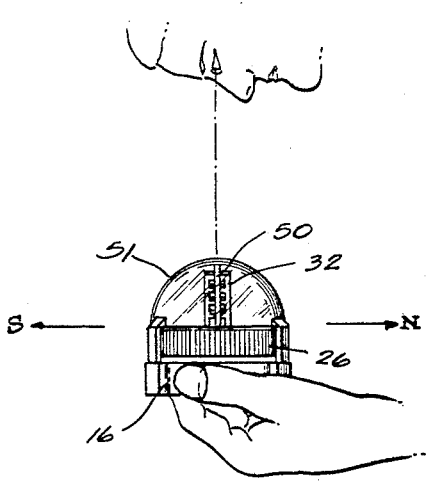
FIGURE 6 is a perspective view showing the solar clock being oriented for use.
Figure 7:
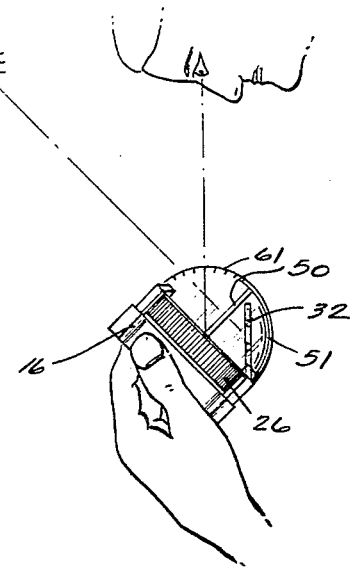
FIGURE 7 is a view showing the solar clock tilted to bring the shadow bar parallel to the axis of the earth.

To utilize the solar clock 10, the first step is to hold it as shown in FIGURE 6 with the plane of the clock face 12 substantially horizontal. The compass needle 62 is now observed to find magnetic north. The latitude line 61 is then oriented in the north, south direction with the lower end of the latitude line 61 pointing south and the upper end pointing north. In the southern hemisphere, the lower end of the latitude line is oriented to the north. The entire solar clock 10 is then tilted as shown in FIGURE 7 with the top end 59 of the shadow bar 50 tilted toward the north. The clock is tilted until the approximate latitude of the user's location is registered on the latitude line 61. This is ascertained by sighting the tip 64 of the shadow bar and positioning the tip vertically beneath the correct latitude mark, as is illustrated in FIGURE 7. A map can be consulted for the approximate latitude reading.

When the solar clock 10 is held in this orientation, the knurled ring 26 is then manually rotated to position the shadow screen 32 for interception of the shadow cast by the shadow bar 50 in the approximate center of the rungs 34 of the shadow screen 32. If the clock is properly calibrated, the correct time on dial 12 will appear at index 15 or beneath the lower edge of the latitude line.

If the clock is not properly calibrated, adjustment and calibration of the solar clock 10 is accomplished by impositive engagement and thus slippage of the inner rotor unit 22 with respect to the planetary rollers 44. This is effectuated by manually grasping and securing from movement the knurled ring 26 and base 16 and then applying torque to the flange 21, of the inner unit 22, thus changing the relative angular relationship or position of the shadow screen 32 to the clock dial 12.

To initially calibrate the clock, and to change calibration for various geographical locations, the relative position of the clock dial 12 to the shadow screen 32 is changed. This change is accomplished by removing the dome 51 and grasping the knurled ring 26 and the base 16 in one hand to secure these parts against rotation as torque is applied to the flange 21 containing the clock 12. This torque overcomes friction in the planetary transmission, thus to slip the frictional engagement between the inner rotor unit 22 and the planetary rollers 44. The clock face 12 is thus physically displaced until the correct time indicia, as observed on some standard timepiece such as a watch, comes opposite mark 15 on the base 16. The dome 51 is then replaced and the solar clock 10 is now calibrated for use in that particular local.

Calibration of the solar clock 10 with known standard time by changing the relative angular position of the shadow screen 32 and the clock dial 12, corrects the solar clock 10 for any error in the lattitude, and applies a correction for the equation of time, and the magnetic declination from true north. Such calibration also takes into account longitude within a standard time zone. The solar clock will also record daylight savings time if calibrated with this time. Movement of the solar clock 10 a substantial distance eastward or westward from the location of calibration will require recalibration for change in longitude.

Once the unit has been calibrated at the location of use, a subsequent time determination is made by orienting the shadow bar 50 north and south, tilting the shadow bar 50 for the correct latitude and then rotating the shadow screen 32 to intercept the shadow cast by the shadow bar 50. The correct time will then be observed on the clock dial 12 under the latitude line 61 or at the index 15.

If it becomes necessary to recalibrate the solar clock because of change in location and the correct time is unknown, an approximate calibration can be accomplished by rotating the inner rotor 22 to register the twelve o'clock indicium with the "S" mark or polar direction indicator 65 on sleeve 25, when both the twelve o'clock indicium and the "S" mark 65 are positioned at the lower end of latitude line 61. This calibration is based upon the assumption that the sun appears directly south at 12 o'clock or noon. The shadow screen is positioned 180° from the "S" mark 65 and thus will intercept the shadow cast by the shadow bar at noon. This approximate calibration, however, does not take into consideration sun fast or sun slow, or location within a time zone.

Once calibrated for correct time or approximately calibrated, the solar clock 10 can also be used to determined direction in areas where a magnetic compass reading would be unreliable, as for instance, in an area where there is a substantial magnetic declination and the declination is unknown, in or near a structure containing steel beams, near an artificially created magnetic field, or where magnetic anomalies are caused by the presence of magnetic ores such as taconite. To determine direction the correct time indicia on the clock dial 12 is registered with the index 15. The correct time may be ascertained by consulting a watch, etc. The solar clock is then tilted to orient the shadow bar 50 at the correct latitude. The entire solar clock 10 is then rotated until the shadow cast by the shadow bar 50 is intercepted by the shadow screen 32. The latitude line 61 will then be oriented in a north, south direction with the upper end 59 of the line pointing north.

While the preferred embodiment shows the clock face on the inner rotor 22, the shadow screen on the intermediate rotor 26 and the shadow bar 50 on the outer rotor, this specific arrangement is not critical. The various indicia elements, namely, the shadow bar, polar direction indicator line, and shadow screen, can be reoriented from one rotor to the other with comparable results. The shadow bar can be secured to the compass. Moreover, the specific form of the various elements is not critical.

I claim:

1. A solar clock comprising a base, a generally cylindrical sleeve rotatable on said base, a shadow screen secured to said sleeve and rotatable therewith, a cylindrical inner rotor unit within and concentric to said sleeve, said inner rotor unit being rotatable about an axis co-axial with the axis of rotation of said sleeve, said inner rotor unit having an upper surface containing a clock dial, a shadow bar, means on said base for supporting said shadow bar above and co-axial with said inner rotor unit, said means including latitude indicia thereon for alignment of said shadow bar parallel to the orbital axis of the earth and motion transmitting means coupling said sleeve and said inner rotor unit, for rotating said clock dial upon rotation of said sleeve and said shadow screen to intercept the shadow cast by said shadow bar.

2. A solar clock in accordance with claim 1 wherein said base has an index mark for calibration purposes.

3. A solar clock in accordance with claim 1 wherein said shadow screen comprises two side rails and a plurality of rungs joining said side rails to form windows.

4. A solar clock in accordance with claim 1 wherein said means for supporting said shadow bar comprises a hemispherical dome with said shadow bar secured to the under surface of said dome and depending therefrom, and means for detachably securing said dome to said base.

5. A solar clock in accordance with claim 4 wherein said means for detachably supporting said dome above said base comprises spaced radially extending mounting ears on said base having apertures therein, and depending legs integral with said dome having terminal pegs which frictionally fit in said apertures in said ears.

6. A solar clock in accordance with claim 1 wherein said motion transmitting means coupling said sleeve and said inner rotor unit for rotating said clock dial comprises three posts equally spaced about the axis of said sleeve upstanding from the base and within said sleeve, a planetary roller on each of said posts rotatable about said posts, said planetary rollers frictionally engaging the inner wall of said sleeve and the outer wall of said inner unit.

7. A solar clock in accordance with claim 6 wherein the ratio of the circumference of the inner wall of said sleeve and the outer wall of said inner unit is 2:1.

8. A solar clock in accordance with claim 1 wherein said inner unit has a receptacle, and a magnetic pointer pivotally supported in said receptacle.

9. A solar clock in accordance with claim 4 wherein said dome has latitude indicia thereon.

10. A solar clock in accordance with claim 1 wherein said clock dial has time indicia spanning 360°.

11. A solar clock comprising a base having a generally cylindrical upstanding wall, a rotatable sleeve within said cylindrical wall, a shadow screen secured to said sleeve, said shadow screen extending inwardly and upwardly toward the axis of rotation of said sleeve, an inner unit within said sleeve and co-axial therewith, said inner unit having time indicia thereon, a hemispherical transparent dome enclosing said inner unit and said shadow screen, a latitude line having latitude graduations on said dome, a shadow bar depending from said dome, said shadow bar being co-axial with said inner unit and said sleeve, motion transmitting means engaging said sleeve, and said inner unit, for co-operative rotation of said inner unit, for registration of the correct time at the lower end of said latitude line upon rotation of said sleeve and said shadow screen to intercept the shadow cast by said shadow bar, said motion transmitting means being adjustable to vary the relative angular position of said shadow bar and said inner unit to compensate for changes in longitude, the equation of time, and magnetic declination.

12. A solar clock comprising concentric, relatively rotatable inner, outer and intermediate rotors, motion transmitting means coupling said inner and intermediate rotors whereby rotation of one of said inner and intermediate rotors will be transmitted to the other of said inner and intermediate rotors, one of said rotors having a shadow bar the other of said rotors having a shadow screen, the said rotor having said shadow bar also having a line with latitude graduations, the said rotor having neither said shadow screen nor said shadow bar being provided with a clock dial, with time indicated on said clock dial at the lower end of said line when said rotor having said shadow bar is oriented with the latitude line in a north, south direction, with the lower end of said line pointing south, and said shadow bar is tilted using said latitude graduations so that said shdow bar is at an angle with a horizontal plane equal to the latitude of location of use, and said rotor with said shadow screen is manually rotated to intercept the shadow cast by said shadow bar.

13. A solar clock comprising concentric, relatively rotatable inner, outer and intermediate rotors, motion transmitting means coupling the said inner and intermediate rotors whereby rotation of one of said inner and intermediate rotors will be transmitted to the other of said inner and intermediate rotors, one of said rotors having a shadow bar, one of said rotors having a polar direction indicator, one of said rotors having a clock face, time being indicated on said clock face when the respective rotors have been turned to orient them as follows:
   (a) the rotor with the direction indicator has said indicator aligned in said polar direction,
   (b) one of the other rotors is turned to intersect an observable indicia thereon with a solar shadow cast by the shadow bar.

14. The clock of claim 13 in which rotor last mentioned has a shadow screen which constitutes said observable indicia.

15. The clock of claim 14 in which said shadow screen is ladder-shaped with cross rungs on which said shadow falls.

16. The clock of claim 13 in which said rotor having the shadow bar also has said polar direction indicator.

17. The clock of claim 13 in which said rotor having the shadow bar comprises an outer base rotor having a transparent dome through which the inner and intermediate rotors are visible, said shadow bar comprising an axially extending stem affixed at its top to the apex of the dome.

18. The clock of claim 16 in which said rotor having the shadow bar also has said polar direction indicator, which comprises an arc-line inscribed on said dome and graduated in degrees of latitude.

19. A solar clock in accordance with claim 13 wherein said motion transmitting means coupling said inner and intermediate rotors is adjustable to vary the relative angular position of said inner rotor to said intermediate rotor to calibrate said solar clock with known time.

References Cited

UNITED STATES PATENTS

| | | | |
|---|---|---|---|
| 78,133 | 5/1868 | Risch | 33—62 |
| 2,637,108 | 5/1953 | Viesturs | 33—62 |

HARRY N. HAROIAN, Primary Examiner